United States Patent
Uno et al.

(12) 
(10) Patent No.: US 6,226,953 B1
(45) Date of Patent: May 8, 2001

(54) WEATHER STRIP RETAINER WITH DRIP MOLDING AND METHOD FOR PRODUCING THE SAME

(75) Inventors: Akihiro Uno; Katsuhisa Ishihara, both of Okazaki; Kazumasa Ohashi, Konko-cho, all of (JP)

(73) Assignees: Mitsubishi Jidosha Kogyo Kabushiki Kaisha, Tokyo-to (JP); Katayama Kogyo Co., Ltd., Okayama-ken (JP)

( * ) Notice: Subject to any disclaimer, the term of this patent is extended or adjusted under 35 U.S.C. 154(b) by 0 days.

(21) Appl. No.: 09/058,807

(22) Filed: Apr. 9, 1998

(30) Foreign Application Priority Data

Apr. 16, 1997 (JP) .................................................. 9-099012

(51) Int. Cl.[7] ...................................................... E04C 2/38
(52) U.S. Cl. ...................... 52/716.5; 52/716.1; 52/716.6; 52/717.06
(58) Field of Search ................................. 52/716.5, 716.1

(56) References Cited

U.S. PATENT DOCUMENTS

| | | | |
|---|---|---|---|
| 4,959,081 | * 9/1990 | Mathellier | 49/490 |
| 5,035,937 | * 7/1991 | Nozaki | 428/122 |
| 5,050,349 | * 9/1991 | Goto et al. | 49/488 |
| 5,056,850 | * 10/1991 | Katcherian et al. | 296/93 |

FOREIGN PATENT DOCUMENTS 8-58391   3/1996   (JP) .

* cited by examiner

Primary Examiner—Carl D. Friedman
Assistant Examiner—Patrick J. Chavez
(74) Attorney, Agent, or Firm—Jordan and Hamburg LLP

(57) ABSTRACT

A weather strip retainer includes a first pillar mount section, a roof mount section, a center pillar mount section, and a drip molding integrally formed on the front pillar mount section and the roof mount section. The roof mount section and the center pillar mount section extends continuously. The center pillar mount section is oriented in a generally vertical direction by bending a boundary zone portion between the roof mount section and the center pillar mount section.

4 Claims, 8 Drawing Sheets

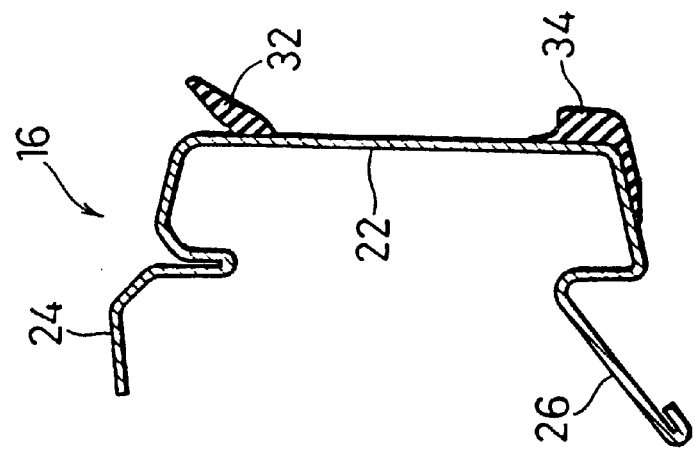
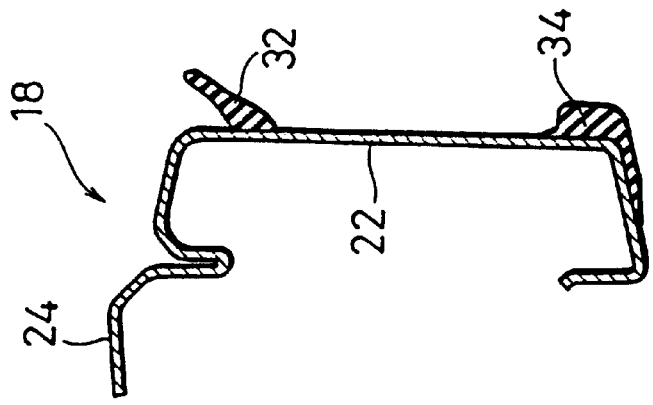
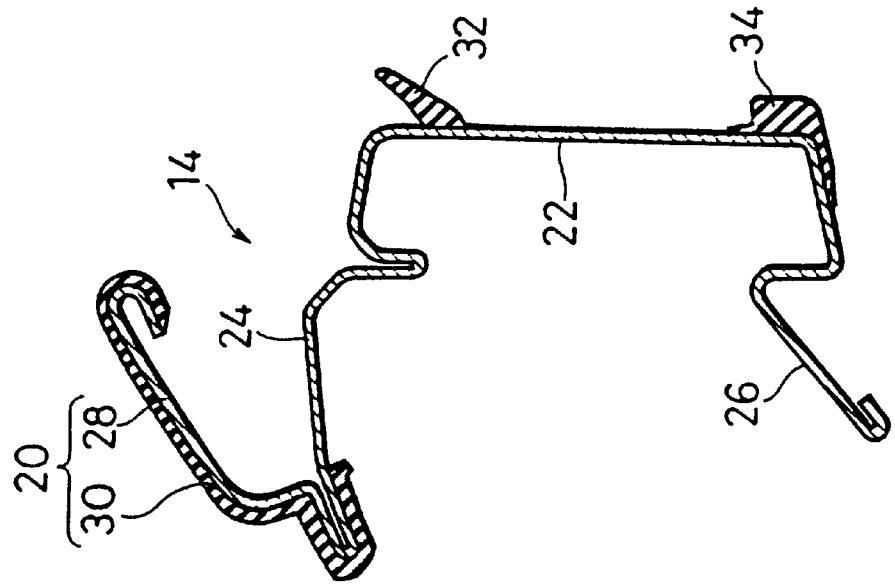

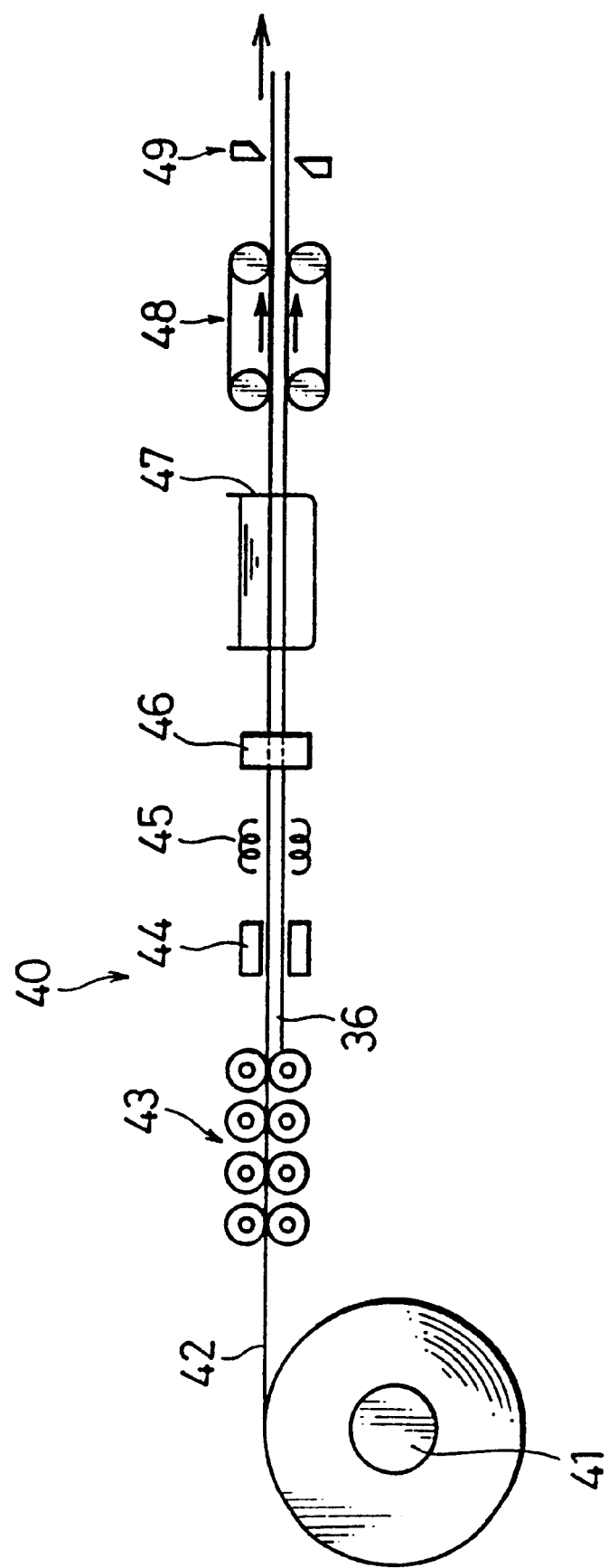

WEATHER STRIP RETAINER WITH DRIP MOLDING AND METHOD FOR PRODUCING THE SAME

BACKGROUND OF THE INVENTION

1. Field of the Invention

This invention relates to a weather strip retainer for retaining a weather strip onto a vehicle body, particularly to a weather strip retainer integrally formed with a drip molding, and a method for producing such weather strip retainer.

2. Description of the Prior Art

In vehicles such as automobiles, a weather strip for sealing a space between a door and a vehicle body is usually mounted to the door of the vehicle; but in the case where it is difficult to mount the weather strip onto the door (e.g., in the case of a sashless door), the weather strip is attached to the vehicle body via a weather strip retainer. Recently, weather strip retainers have been formed integrally with a drip molding to reduce the number of parts.

Illustrated in FIG. 9 is an example of such conventional weather strip retainer with a drip molding. The illustrated weather strip retainer comprises a front pillar mount section 80 to be mounted on a front pillar of the vehicle body, a roof mount section 82 horizontally extending along to be mounted on a roof of the vehicle body, and a center pillar mount section 84 to be mounted on a center pillar of the vehicle body. The front pillar mount section 80 and the roof mount section 82 are integral with each other. The front pillar mount section 80 extends obliquely downward from the horizontally extending roof mount section 82. A drip molding 86 is integrally formed on an outer edge portion of the front pillar mount section 80 and the roof mount section 82.

The center pillar mount section 84 in which the drip molding 86 is not provided is formed separately from the front pillar mount section 80 and the roof mount section 82 and is connected to the roof mount section 82 at the rear end portion thereof (right side as viewed in FIG. 9) via a joint member 83 produced by a press forming or the like with oriented substantially in a vertical direction.

The reference numeral 85 in FIG. 9 designates mounting holes for screws for attaching the respective mount sections 80, 82, 84 to the vehicle body.

Shown in FIG. 10 is a detail of the mounting structure of the roof mount section 82 of the weather strip retainer. The roof mount section 82 has a shape opening outward of the vehicle (left side as viewed in FIG. 10) and a weather strip WS is fit to the inside of the roof mount section 82. A drip molding base 88 is formed further outwardly from an outer edge (an upper edge as viewed in FIG. 10) of the roof mount section 82. A seal layer 89 made of rubber or synthetic resin is fixedly attached on the front surface of the drip molding base 88. In this way, the drip molding 86 is formed.

At the back of the roof mount section 82 (right side as viewed in FIG. 10), sealing lips 91, 92 projecting continuously from the roof mount section 82 along the longitudinal direction thereof are fixedly attached. A screw 96 is inserted through the mounting hole 85 from outside and fitted in a gromet 94 attached on a vehicle body panel (a roof panel 90 in FIG. 10), the roof mount section 82 is attached to the roof panel 90 with the sealing lips 91, 92 being in contact with an outer surface of the roof panel 90.

The front pillar mount section 80 and the center pillar mount section 84 have the same structure as the roof mount section 82 shown in FIG. 10 except that the center pillar mount section 84 has no drip molding 86.

With this structure, when the door is closed, a marginal portion of a window glass G of the door is brought into press-contact with the weather strip WS, and thereby the window glass of the door is sealed at the marginal portion thereof to prevent wind and rain from entering the interior of the vehicle body through a gap between the window glass G and the vehicle body.

However, the conventional weather strip retainer has the following problems.

In the conventional weather strip retainer 10, the center pillar mount section 84 with no drip molding 86 is formed separately from the front pillar mount section 80 and the roof mount section 82 having the drip molding and is connected thereto via the joint member 83. Thus, the weather strip retainer 10 needs three components in total, i.e., the front pillar mount section 80 and roof mount section 82; the center pillar mount section 84; and the joint member 83. This makes the mounting structure complicated and increases assembling steps, which thus providing a very obstacle in cost reduction.

Besides, the weather strip retainer is separated into three parts. Accordingly, the weather strip retainer is more liable to cause a gap than continuously extending retainers, consequently lowering the sealability disadvantageously.

SUMMARY OF THE INVENTION

It is an object of the present invention to provide a weather strip retainer with a drip molding and a weather strip retainer producing method which have overcome the problems residing in the prior art.

According to an aspect of the present invention, a weather strip retainer comprising: a roof mount section to be mounted on a roof of a vehicle body, the roof mount section having two opposite end portions; a first pillar mount section continuously extending from one end portion of the roof mount section and to be mounted on a first pillar of the vehicle body; a second pillar mount section continuously extending in a generally vertical direction from the other end portion of the roof mount section and to be mounted on a second pillar of the vehicle body; and a drip molding formed integrally with the roof mount section and first pillar mount section.

According to another aspect of the present invention, a method for producing a weather strip retainer, comprising steps of: forming a blank having a retainer main body and a drip molding integral with the retainer main body; bending the blank at an intermediate portion thereof to define a roof mount section to be mounted on a roof of a vehicle body and a first pillar mount section to be mounted on a first pillar of the vehicle body; cutting away a specified portion of the drip molding, the specified portion corresponding to a second pillar mount section to be mounted on a second pillar of the vehicle body, the second pillar mount section being to be defined; and bending the blank at a boundary zone portion between the second pillar mount section and the roof mount section in such a manner that the second pillar mount section directs in a generally vertical direction.

The drip molding is formed integrally with the roof mount section and the first pillar mount section. The second pillar section is extended continuously from the roof mount section. In this way, the retainer is formed into one body as a whole. This will simplify the construction of a weather strip retainer with a drip molding, and thus greatly reduce the production costs of a weather strip retainer with a drip molding.

BRIEF DESCRIPTION OF THE DRAWINGS

FIG. 2A is a sectional view taken along the line IIA—IIA in FIG. 1; FIG. 2B is a sectional view taken along the line IIB—IIB in FIG. 1; and FIG. 2C is a sectional view taken along the line IIC—IIC in FIG. 1;

FIG. 4 is a schematic diagram showing a system for forming a blank into the weather strip retainer;

DETAILED DESCRIPTION OF THE PREFERRED EMBODIMENT OF THE INVENTION

Figure 1:
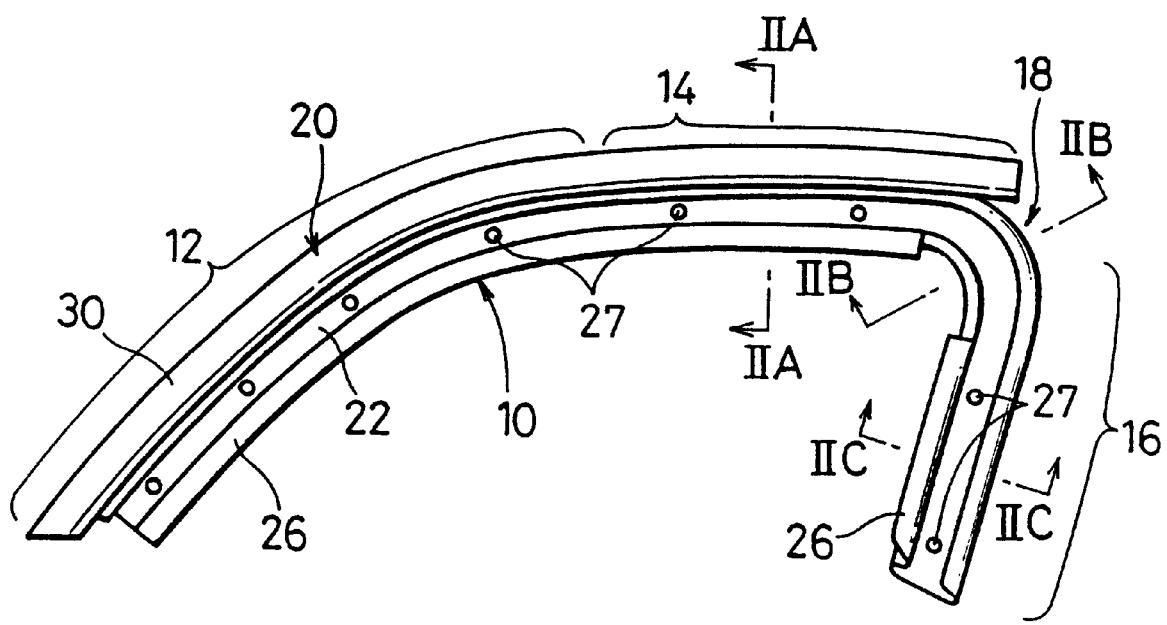
FIG. 1 is a front view of a weather strip retainer with a drip molding embodying the invention.

Referring now to FIGS. 1–8, a preferred embodiment of the invention is described hereinafter. A weather strip retainer 10 illustrated in FIGS. 1 and 2 includes a front pillar mount section (first pillar mount section) 12 to be mounted on a front pillar (first pillar) of a vehicle body; a roof mount section 14 to be mounted on a roof panel of the vehicle body; and a center pillar mount section (second pillar mount section) 16 to be mounted on a center pillar (second pillar) of the vehicle body. The front pillar mount section 12, the roof mount section 14 and the center pillar mount section 16 are formed into one body. A drip molding 20 is formed in an area extending from the front pillar mount section 12 to the roof mount section 14.

Figure 10:
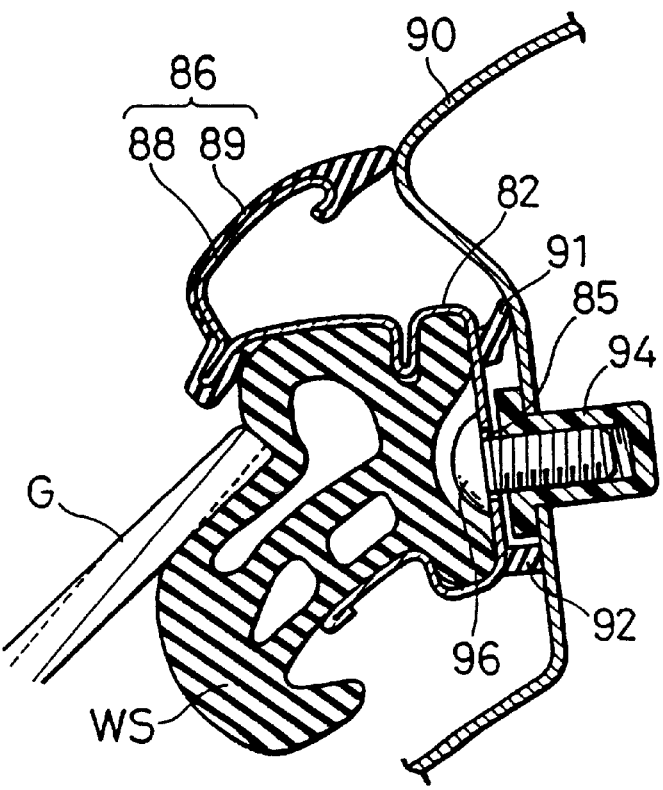
FIG. 10 is a sectional view taken along the line X—X in FIG. 9.

As shown in FIGS. 2A, 2B, and 2C, a retainer main body 22 has a generally inverted C-shaped section with its end opening outward of the vehicle body (left side in FIGS. 2A–2C to hold a weather strip WS, such as the one as shown in FIG. 10, in an inside of the retainer main body 22. A top wall portion 24 extends outwardly of the vehicle body from an outer edge portion of the retainer main body 22 (an upper edge portion as viewed in FIGS. 2A–2C), and a flange 26 is formed for reinforcement at an inner edge portion (a lower edge portion as viewed in FIGS. 2A–2C).

A drip molding base 28 extends further upwardly from the top wall portion 24, and a seal layer 30 made of rubber or synthetic resin is fixedly attached on a front surface of the drip molding base 28. The drip molding base 28 and the seal layer 30 constitute the drip molding 20. As shown in FIG. 1, the drip molding 20 is terminated near a rear end of the roof mount section 14 and accordingly is not provided at boundary zone portion 18 between the roof mount section 14 and the center pillar mount section 16 and on the center pillar mount section 16.

The flange 26 is formed almost all along the weather strip retainer 10 but is cut away at the boundary zone portion 18 between the roof mount section 14 and the center pillar mount section 16. The retainer is bent at the boundary zone portion 18 and is formed into the retainer shape in which the center pillar mount section 16 runs generally vertically from the roof mount section 14 extending horizontally.

The reference numeral 27 in FIG. 1 designates mounting holes through which screws are passed to attach the weather strip retainer 10 to the body at several positions thereof.

Sealing lips 32, 34, which extend continuously all along a longitudinal direction of the weather strip retainer 10, are bonded on a back surface of the retainer main body 22 at its outer end portion (upper right as viewed in FIGS. 2A–2C) and its inner end portion (lower right as viewed in FIGS. 2A–2C). Under the condition that the weather strip retainer 10 is attached to a specified part of the vehicle body (e.g., the roof panel 90 shown in FIG. 10), the sealing lips 32, 34 are elastically deformed and brought into contact with a surface of the vehicle body so as to seal the gap between the weather strip retainer 10 and the vehicle body.

In this weather strip retainer 10, in addition to the front pillar mount section 12 and the roof mount section 14 being formed into one body, the roof mount section 14 and the center pillar mount section 16 are so formed as to be integral with each other. Thus, the weather retainer 10 is one body as a whole. This assures a simplified structure as compared with the conventional retainer, and eliminates the need of assembling a number parts into one body, thus achieving reduction in costs.

In addition, since the weather strip retainer 10 extends continuously all along its longitudinal direction and also the sealing lips 32, 34 are fixedly attached on the back surface of the weather strip retainer 10 along the longitudinal direction, the gap between the vehicle body and the retainer main body can be sealed more tightly as compared with the conventional weather strip retainer whose roof mount section and center pillar mount section are separated from each other at the boundary zone portion.

Figure 8:
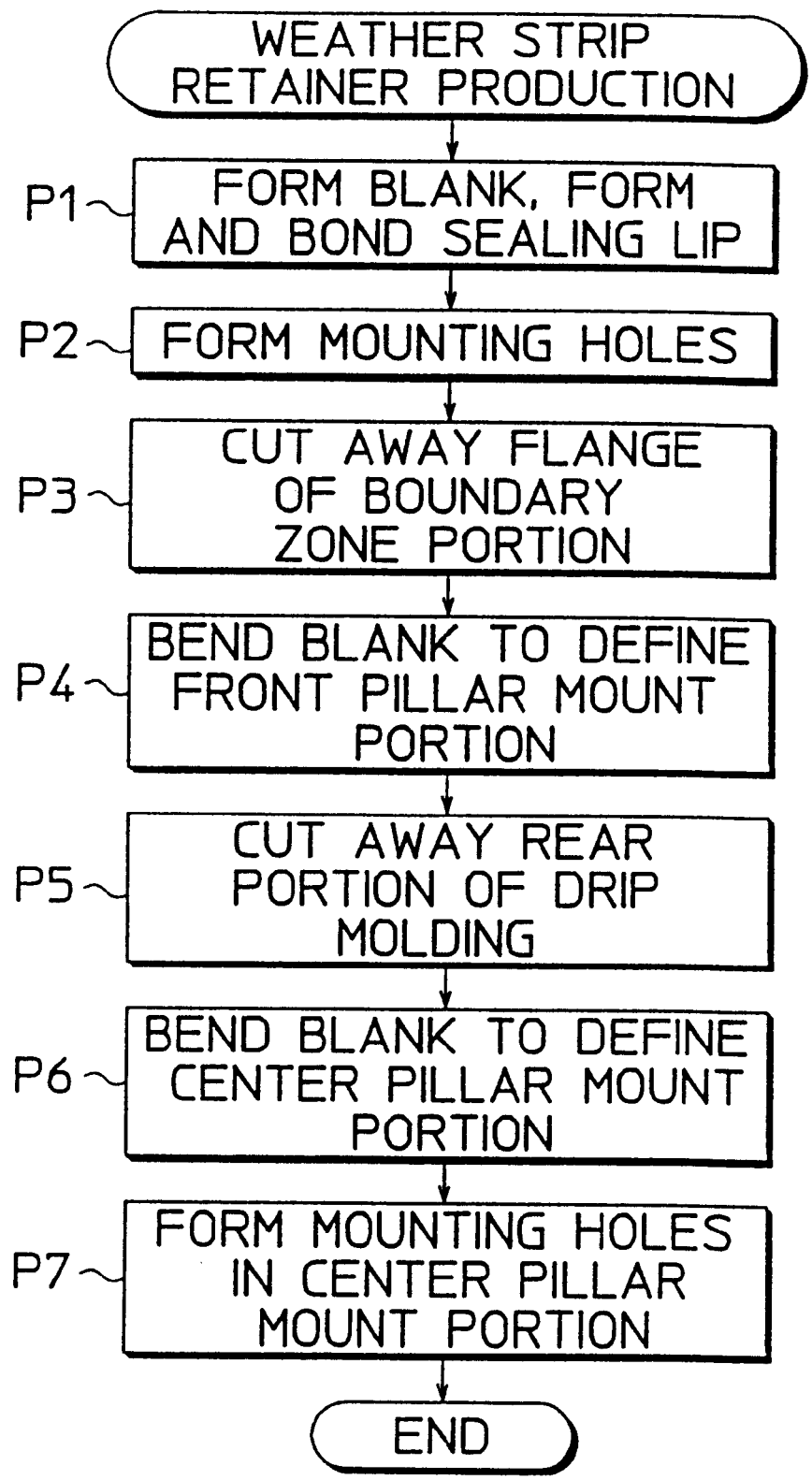
FIG. 8 is a flowchart showing steps of producing the weather strip.
Figure 9:
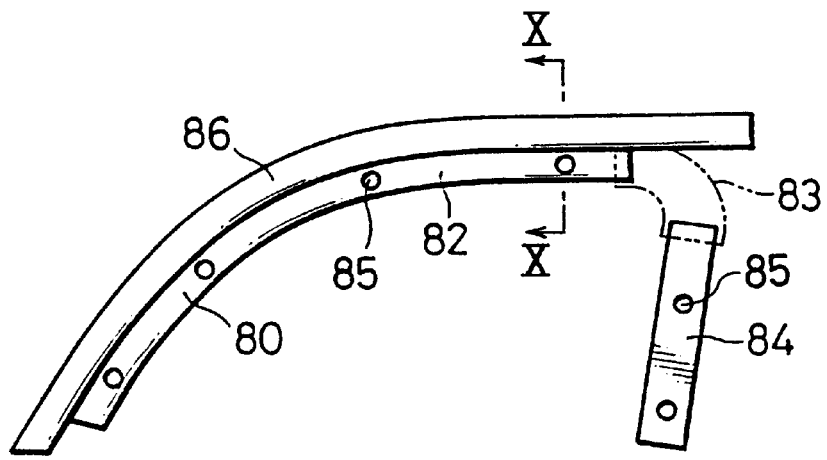
FIG. 9 is a front view of a conventional weather strip retainer with a drip molding.

The weather strip retainer 10 is produced in the following steps (FIG. 8).

Figure 3A:
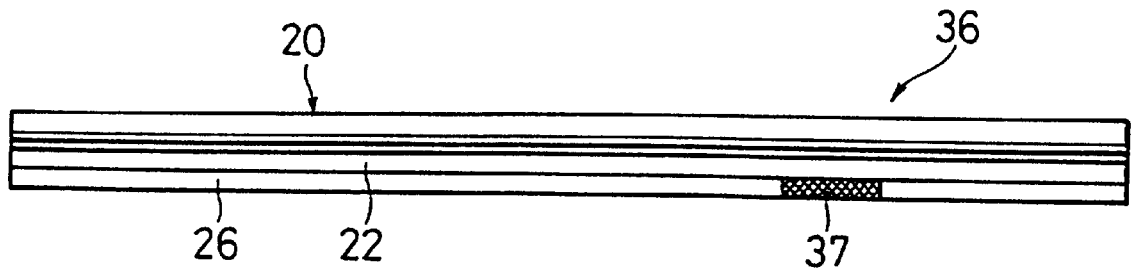
FIG. 3A is a front view showing a blank to be produced into the weather strip retainer.
Figure 3B:
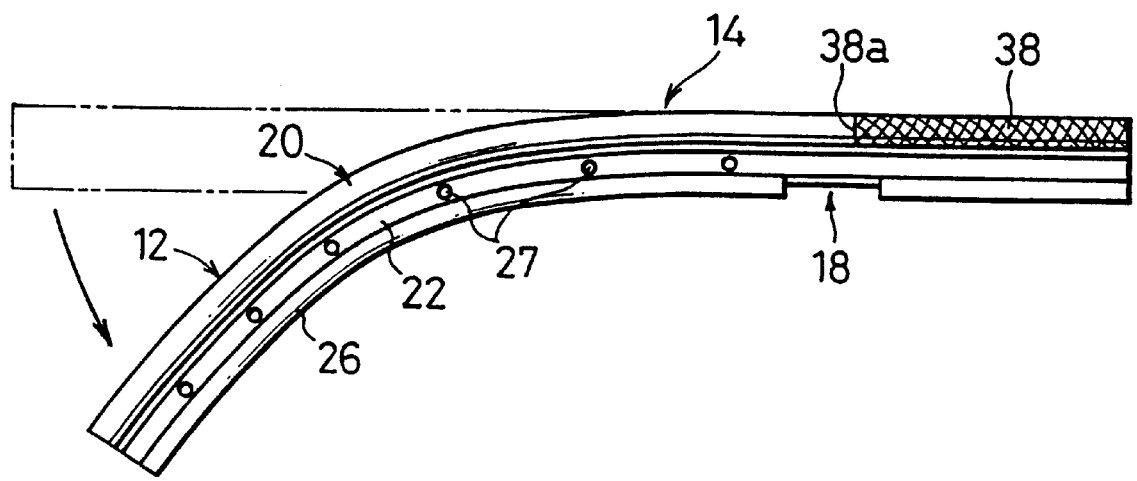
FIG. 3B is a front view showing the blank given a first bending.
Figure 3C:
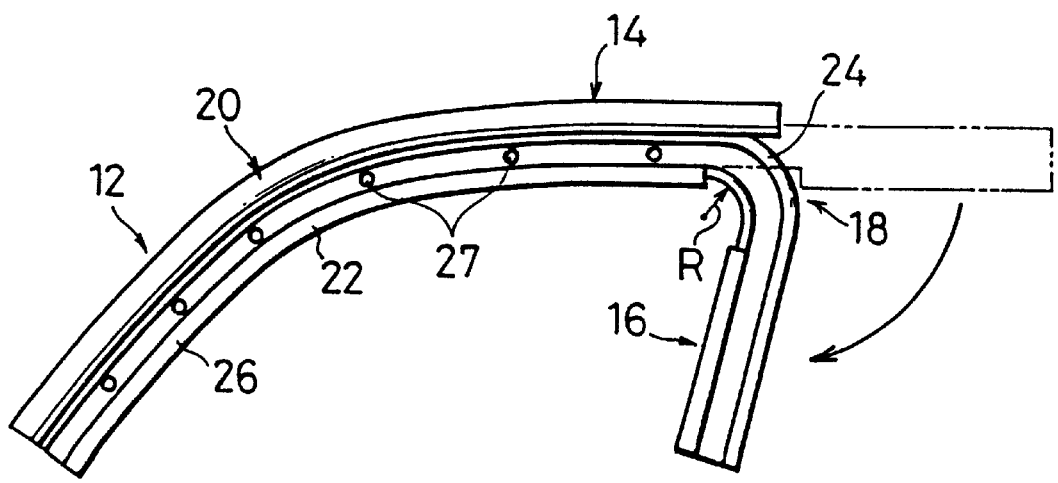
FIG. 3C is a front view showing the blank given a second bending.

Step P1: As shown in FIG. 3A, a straight blank 36 is first formed which integrally has the retainer main body 22 and the drip molding 20. The sealing lips 32, 34 are then bonded on the back surface of the blank 36.

The forming of the blank and the bonding of the sealing lips on the back surface of the blank is performed by use of a system shown in FIG. 4. Specifically, a thin strip plate 42 made of a suitable metallic material (e.g., stainless steel) is wound on a core 41 as shown in FIG. 4. The strip plate 42 is drawn out from the coiled core 41 and formed into the shape shown in FIG. 2A via a number of forming rollers 43 which are located at specified positions corresponding to the section of the retainer. Thereafter, adhesive is applied to the formed blank 36 at specified positions by an adhesive applying apparatus 44. The adhesive is heated with a high frequency heating apparatus 45. The sealing lips 32, 34 made of rubber or synthetic resin are continuously extruded from an extruder, and bonded onto the adhesive applied portion of the blank 36. After completion of the bonding of the sealing lips 32, 34, the blank 36 is cooled down in a water tank 47, and cut off at a proper position with a cutting machine 49 after passing through a drawing apparatus 48. After being attached with sealing members at specified positions, the blank 36 is transferred to the next step.

Step P2: The mounting holes 27 are formed in the front pillar mount section 12 of the retainer main body 22.

Figure 5:
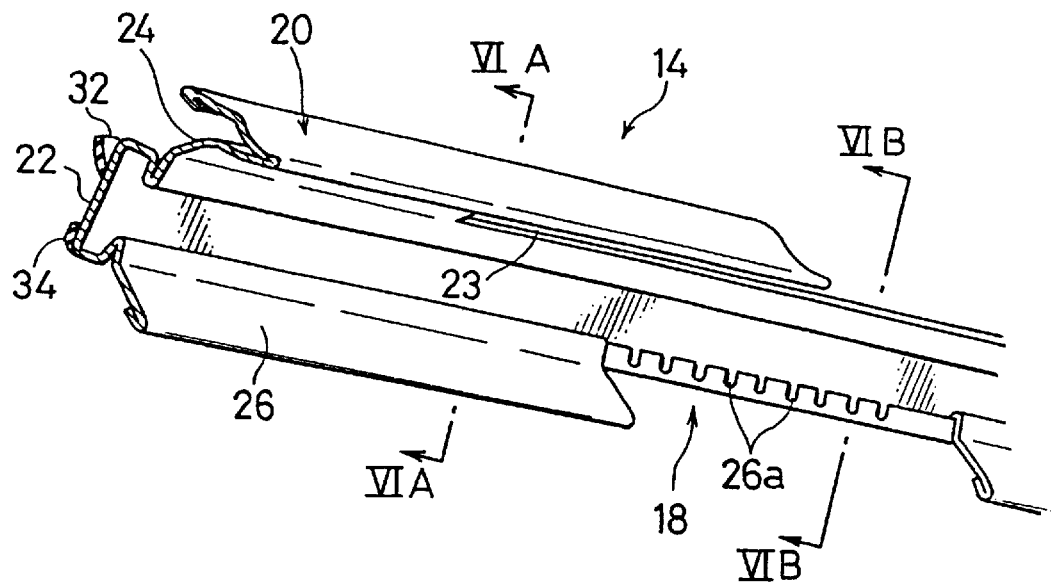
FIG. 5 is a perspective view showing the blank with a part of a flange being removed.
Figure 6A:
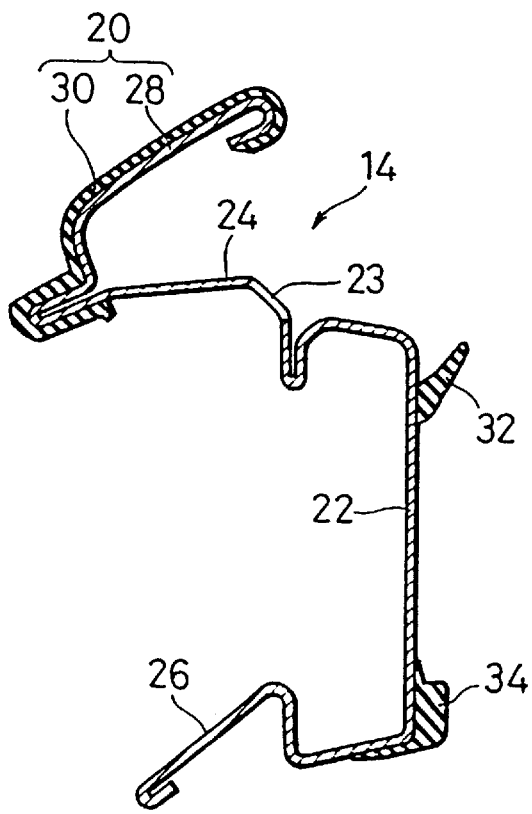
FIG. 6A is a sectional view taken along the line VIA—VIA in FIG. 5.
Figure 6B:
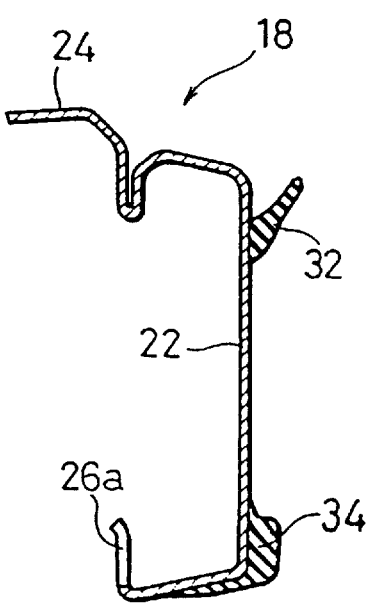
FIG. 6B is a sectional view taken along the line VIB—VIB in FIG. 5.

Step P3: A portion of the flange 26 of the blank 36 is cut away. The cut-away portion corresponds to the boundary zone portion 18 shown in FIG. 1 (a meshed part 37 in FIG. 3A). The provision of the cut-away portion facilitates bending of the blank 36 which is performed at Step P6 to be described later. Further, as shown in FIGS. 5 and 6B, the bending is made easier by forming a number of slits 26a in the portion of the flange 26 that corresponds to the boundary zone portion 18.

Step P4: The blank 36 is bent at a boundary zone portion between the portion corresponding to the front pillar mount section 12 and the portion corresponding to the roof mount section 14 (see an arrow in FIG. 3B) to define the front pillar mount section 12 and the roof pillar mount section 14.

In other words, in this step, the blank 36 is formed into such a shape that the front pillar mount section 12 extends obliquely downward from the roof mount section 14.

Step P5: A rear portion of the drip molding 20 is cut away. In other words, the portion corresponding to the boundary zone portion 18 and the center pillar mount section 16 (a meshed part 38 in FIG. 3B) is cut away. Specifically, a slit is formed between the portion to be cut away and the portion to be remained (at the position indicated by a vertical line 38a in FIG. 3B) by a metal sawing machine and the cutaway portion is separated by a press machine. In a portion before the meshed portion 38 (the cut-away portion), further, a slit 23 is formed a predetermined length in a boundary between the top wall portion 24 and the retainer main body 22, as shown in FIGS. 5 and 6A. In this way, the retainer main body 22 is partially separated from the drip molding 20 and the top wall portion 24 over the predetermined length.

Figure 7:
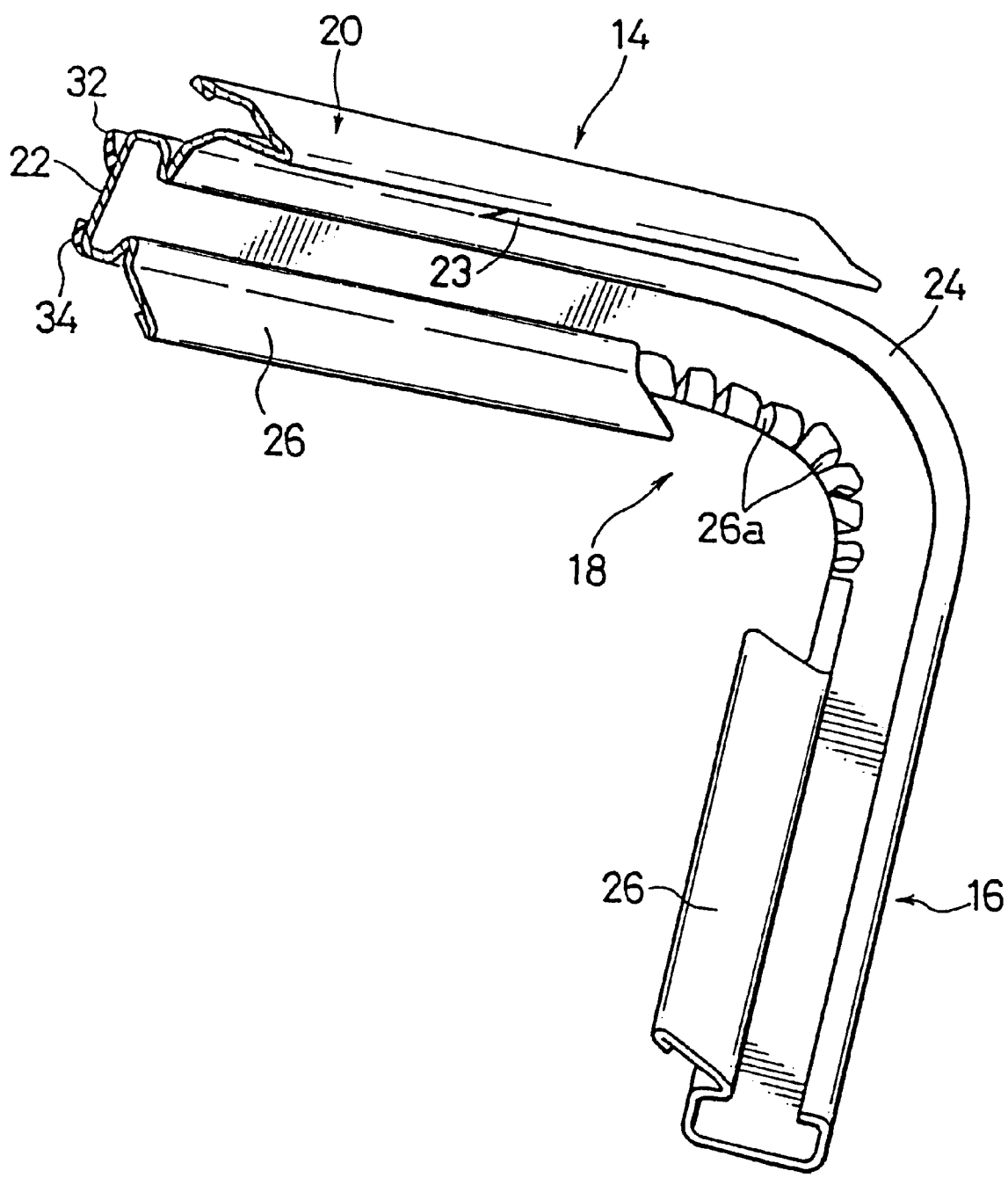
FIG. 7 is a perspective view showing the blank given the bendings.

Step P6: The blank 36 is bent at the boundary zone portion 18 between the roof mount section 14 and the center pillar mount section 16 or in the portion at which the flange 26 is cut away in the direction indicated by the arrow in FIG. 3C until the center pillar mount section 16 runs generally vertically, as shown in FIG. 7.

The curvature radius R of the bending portion should be set at such a value that an impermissible excessive elongation occurs in an outer side of the bending portion.

Step P7: The mounting holes 27 are formed in the retainer main body 22 in the center pillar mount section 16. Its ends are cut into a specified form. Consequently, the weather strip retainer 10 with the drip molding 20 is produced.

It should be noted that the invention is not limited to the above described embodiments, but may be modified as follows.

(1) The flange 26 may be omitted; but provision of the flange 26 has an advantage in reinforcing the weather strip retainer effectively. Besides, in bending the weather strip retainer having a flange to define the center pillar portion 16, no substantial difficulty is presented by simply cutting off the part of the flange corresponding to the boundary zone portion 18.

(2) In the system shown in FIG. 4, after the blank 36 is formed via the forming rollers, the adhesive bonding of the sealing lips 32, 34 is performed prior to the bending of the formed blank; Instead of this, a sealing tape may be bonded on the back surface of the retainer main body 22 after the bending of the formed blank 36 is completed. However, it is preferable that the forming of the blank 36 by the forming rollers and the extruding and bonding of the sealing lips 32, 34 are performed continuously, as illustrated in the FIG. 4, because f increased efficiency and productivity.

(3) Illustrated in the drawings is an example of the weather trip retainer 10 for a front door. The weather strip retainer of the invention is applicable to a rear door as well.

In this case, a part mounted on a rear pillar is equivalent of the first pillar mount section as specified herein and a part mounted on the center pillar is equivalent of the second mount section as specified herein.

As described above, an inventive weather strip retainer includes a roof mount section, a first pillar mount section continuously extending from one end portion of the roof mount section, a second pillar mount section continuously extending in a generally vertical direction from the other end portion of the roof mount section and to be mounted on a second pillar of the vehicle body, and a drip molding formed integrally with the roof mount section and the first pillar mount section.

It may be preferable to provide the first pillar mount section, the roof mount section, and the second pillar mount section with a flange. In this case, the flange of the first pillar mount section and the flange of the roof mount section are continuous, but the flange of the roof mount section and the flange of the second pillar mount section are discontinuous.

It may be preferable to provide the first pillar mount section, the roof mount section, and the second pillar mount section with a sealing member on an inner surface thereof continuously.

Also, an inventive method for producing a weather strip retainer includes steps of forming a blank having a retainer main body and a drip molding integral with the retainer main body, bending the blank at an intermediate portion thereof to define a roof mount section and a first pillar mount section, cutting away a specified portion of the drip molding, the specified portion corresponding to a second pillar mount section, and bending the blank at a boundary zone portion between the second pillar mount section and the roof mount section in such a manner that the second pillar mount section directs in a generally vertical direction.

Further, there may be provided steps of forming a flange along a length of the blank before bending the blank at the intermediate portion thereof, and cutting away a portion of the flange corresponding to the boundary zone portion before bending the blank at the boundary zone portion.

Furthermore, there may be provided a step of attaching a sealing member on an inner surface of the blank, or a step of attaching a sealing tape on an inner surface of the blank after bending the blank.

It may be appreciated to form the blank by passing a metal strip through a roller former; and continuously extrude and attach the sealing member on the inner surface of the blank. The blank attached with the sealing member is cut by a specified length.

With thus constructed weather strip retainer, the drip molding is formed integrally with the roof mount section and the first pillar mount section. Furthermore, the second pillar section is extended continuously from the roof mount section. In this way, the retainer is formed into one body as a whole. This simplifies the structure of weather strip retainer with a drip molding, and eliminate the need of assembling a number of parts, thus achieving remarkable reduction in costs.

Also, the weather strip retainer is formed with a flange in the first pillar mount section, the roof mount section and the second pillar mount section, and thus have a reinforced strength. Further, there will no difficulty in bending the blank having a flange by cutting away the part of the flange corresponding to the boundary zone portion between the roof mount section and the second pillar portion.

In addition, the weather strip retainer is provided with the sealing member or sealing tape on the inner surface of the blank. These sealing member assure tight sealing between the weather strip retainer and the vehicle body.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A weather strip retainer adapted to retain a weather strip on a vehicle body in which the vehicle body has a roof and first and second pillars, said retainer comprising:

a roof mount section adapted to be mounted on a roof of a vehicle body, the roof mount section having two opposite end portions;

a first pillar mount section continuously and integrally extending from one end portion of the roof mount section and adapted to be mounted on a first pillar of the vehicle body;

a second pillar mount section continuously and integrally extending in a generally vertical direction from the other end portion of the roof mount section and adapted to be mounted on a second pillar of the vehicle body;

the pillar mount section, the roof mount section, and the second pillar mount section being provided with a flange, the flange of the first pillar mount section and the flange of the roof mount section being continuous, the flange of the roof mount section and the flange of the second pillar mount section being discontinuous; and a drip molding formed integrally with the roof mount section and the first pillar mount section.

2. A weather strip retainer according to claim 1, wherein the first pillar mount section, the roof mount section, and the second pillar mount section have a front surface, and further comprising a sealing member provided on said inner surface.

3. A weather strip retainer adapted to retain a weather strip on a vehicle body in which the vehicle body has a roof and first and second pillars, said retainer comprising:

a roof mount section adapted to be mounted on a roof of a vehicle body, the roof mount section having two opposite end portions;

a first pillar mount section continuously and integrally extending from one end portion of the roof mount section and adapted to be mounted on a first pillar of the vehicle body;

a second pillar mount section continuously and integrally extending in a generally vertical direction from the other end portion of the roof mount section and adapted to be mounted on a second pillar of the vehicle body;

said second pillar mount section having an end portion integral with said other end portion of the roof mount section such that said end portion of said second pillar mount section and said other end portion of said roof mount section form an integral transition part between said second pillar mount section and said roof mount section; and a drip molding formed integrally with the roof mount section and the first pillar mount section.

4. A weather strip retainer according to claim 3 wherein said roof mount section and said first and second pillar mount sections have an inverted generally C-shaped cross sectional configuration including a base part and two leg parts extending from said base part, a flange extending from one of said leg parts along said first pillar mount section and along a part of said roof mount section and a part of said second pillar mount section, said transition part being devoid of said flange.

* * * * *